United States Patent
Black

(10) Patent No.: US 6,527,290 B1
(45) Date of Patent: Mar. 4, 2003

(54) RECUMBENT BICYCLE AND APPARATUS FOR FORMING SAME

(75) Inventor: James G. Black, 12721 Appleview La., Burnsville, MN (US) 55337

(73) Assignee: James G. Black, Burnsville, MN (US)

( * ) Notice: Subject to any disclaimer, the term of this patent is extended or adjusted under 35 U.S.C. 154(b) by 0 days.

(21) Appl. No.: 09/573,754

(22) Filed: May 18, 2000

(51) Int. Cl.[7] .............................. B62K 13/00; B62K 5/00
(52) U.S. Cl. .................... 280/288.1; 280/274; 280/7.15
(58) Field of Search ............................ 280/288.1, 7.1, 280/7.15, 281.1, 274

(56) References Cited

U.S. PATENT DOCUMENTS

| | | | |
|---|---|---|---|
| 3,794,352 A | 2/1974 | Popp | 280/209 |
| 3,836,175 A | 9/1974 | Pomerance et al. | 280/209 |
| 3,857,583 A | 12/1974 | Vanover | 280/282 |
| 3,865,401 A | 2/1975 | Kingsly | 280/209 |
| 3,902,738 A | 9/1975 | Gandrud | 280/209 |
| 3,938,827 A | 2/1976 | Johnson | 280/209 |
| 4,093,258 A | 6/1978 | Ansel | 280/231 |
| 4,227,589 A | 10/1980 | Chika | 180/206 |
| 4,540,190 A * | 9/1985 | Moulton | 280/281.1 |
| 4,834,410 A | 5/1989 | Parker | 280/209 |
| 4,925,203 A | 5/1990 | Buckler | 280/278 |
| 5,342,074 A | 8/1994 | Amdahl et al. | 280/209 |
| 5,511,809 A | 4/1996 | Sagi | 280/209 |
| 5,584,494 A | 12/1996 | Krumm | 280/288.1 |
| D385,225 S | 10/1997 | Challoner et al. | D12/109 |
| 5,853,062 A | 12/1998 | Hulett | 180/206 |
| D408,761 S | 4/1999 | Challoner et al. | D12/109 |
| 5,951,034 A | 9/1999 | Mayo | 280/288.1 |

OTHER PUBLICATIONS

MICROCAR, Lightfoot Cycles, 179 Leavens Road, Darby, MT 59829; info@lightfootcycles.com.
Just Two Bikes®, Inc., About the JTB® Cycle.
Just Two Bikes®, Inc., JTB® Montage®–ex.
Just Two Bikes®, Inc., JTB® Montage®–i.
CSI Cycle Systems International, "Cosycycle Cosy Rider".
CSI Cycle Systems International, "Cosycycle Sportster".
CSI Cycle Systems International, "Cosycycle Grand Sport".
CSI Cycle Systems International, "Cosycycle Elite".
CSI Cycle Systems International, "Cosycycle Golf Buddy".
CSI Cycle Systems International, "Cosycycle Work Buddy".
CSI Cycle Systems International, Frequently–Asked Questions.
CSI Cycle Systems International, "Cosycycle" Features & Specifications.

(List continued on next page.)

*Primary Examiner*—Kevin Hurley
*Assistant Examiner*—Matt Luby
(74) *Attorney, Agent, or Firm*—Nawrocki, Rooney & Sivertson, P.A.

(57) ABSTRACT

A recumbent bicycle, the manufacture thereof, and apparatus for forming same, is provided. The recumbent bicycle generally includes a frame having joined forward and rearward frame portions. The forward frame portion is a sit-up bicycle frame adpated to support a steerable front ground engaging wheel. The rearward frame portion is adapted to support a suspension assembly and substantially bear a rider thereon. Preferably, the sit-up bicycle frame includes a head tube, down tube, bottom bracket, seat tube, chainstay, seatstay, and dropouts, and the rearward frame portion includes a supplemental chainstay. The rearward frame portion is joined to the forward frame portion such that the supplemental chainstay rearwardly extends from the dropouts as a substantial continuation of the chainstay of the forward frame portion. The apparatus of the subject invention permits transformation of a sit-up bicycle into a recumbent bicycle, and generally includes a frame extension appliance for affixation to the frame of the sit-up bicycle so as to rearwardly extend therefrom. The extension appliance is adapted to support a suspension assembly, and substantially bear a rider thereon.

10 Claims, 8 Drawing Sheets

OTHER PUBLICATIONS

CSI Cycle Systems International, "Cosycycle" Options.
Quadracycle, Inc., Hamilton, IN, Welcome to Quadracycle Inc.
Quadracycle, Inc., "Options".
Quadracycle, Inc., "Showroom".
Quadracycle, Inc., Introducing the GEM Side–By–Side Recumbent Tricycle.
Isanti Engineering Inc., Fergus Falls, MN, "Tri–Hauler Twin Ped".
Freetime Distributing, Inc., Solvang, CA, "Take a Look at Our Fleet of Surreys".

* cited by examiner

RECUMBENT BICYCLE AND APPARATUS FOR FORMING SAME

TECHNICAL FIELD

The present invention generally relates to bicycles, more particularly to a recumbent bicycle incorporating a conventional sit-up bicycle frame, the manufacture/assembly thereof, and, apparatus for cost-effectively forming a responsive, easy to ride recumbent bicycle using conventional sit-up bicycle components.

BACKGROUND OF INVENTION

The frame is the most important part of a bicycle for many reasons. It provides—by the way it locates and spaces your saddle, crank set, and handlebars—a geometry that positions a rider's body for efficient pedaling. The same geometry also determines the handling, or behavior of a bike. How stably it races down hill, its willingness to cut deeply into corners, and its ability to carry loads—all of these factors are determined by the frame's geometry. The bike's general handling and comfort, and the rider's position on it, are determined by its frame.

A conventional bicycle frame is often described by its two halves, the front and the rear triangles. The front triangle, also known as the main triangle, is actually a quadrilateral. It consists of the following tubes: the head tube, which is located at the front of the frame and holds the headset, or steering bearings; the top tube, which connects the head tube and the seat tube under your saddle; the seat tube, which runs from the seat down to the bottom bracket; and the down tube, which runs from the head tube down to the bottom bracket. The bottom bracket holds the bearings and axle of the crank set.

The rear triangle consists of the chainstays and the seatstays. The chainstays are the twin tubes that connect the bottom bracket and the two rear axle holders known as the dropouts. The seatstays are the twin tubes that connect the dropouts and the junction of the tubes under the saddle, called the seat cluster. Technically, the seat tube completes the triangle. However, when frame builders or bike mechanics talk about the rear triangle, they are usually referring only to the two sets of stays.

Completing the conventional frame are the fork and the steerer tube. The fork consists of two fork blades that are attached to a horizontal piece know as the fork crown. At the lower end of the blades are the two front axle holders known as fork tips or front dropouts. The steerer tube rises out of the crown at the top of the blades and is normally "hidden" (i.e., received) in the head tube. It connects the fork crown to the head set.

The traditional bicycle frame is generally known as the diamond frame, because of its shape, and historically referred to as the "mens" frame. Other conventional frame configurations include the "ladies" frame, wherein the top tube is replaced by a second down tube, which makes mounting and dismounting the bike easier, but eliminates much of its structural strength, and the mixte frame, which is a compromise between the diamond frame and the ladies frame, as the top tube is replaced with twin lateral tubes that run from the head tube all the way back to the rear axle. Of these three frame styles, the diamond frame still provides the best combination of rigidity, strength, and light weight.

Whereas most of today's bicycles are of a conventional sit-up design, numerous attempts have been made to introduce recumbent bicycle designs. The recumbent bicycle is generally longer than a conventional sit-up bicycle, positioning a rider lower with respect to the ground, and is characterized by the rider sitting slightly reclined in a high-backed seat. The recumbent bicycle provides increased comfort, greater pedal efficiency, and a lower center of gravity when compared to the conventional sit-up bicycle. At present, single rider recumbent bicycles styles are generally characterized by their wheel base length: long wheel base (65–71"); short wheel base (33–45"); and, compact long wheel base (46–64"), with each style offering specific handling characteristics consistent with its frame configuration.

Despite their potential advantages in comfort (e.g., the generally reclined position of a rider, the notion of sitting in a "chair", with a back support, as opposed to upon a "saddle", ergonomic positioning of the handlebars either at shoulder level for "above seat steering", or below the seat, "below seat steering," at a position where a riders arms naturally hang), and their ergonomically superior power utilization potential (i.e., a pedal to seat relationship for an improved degree of pushing power), recumbent bicycles have met with limited commercial success.

Particularly burdensome has been the difficulty of working around the geometric limitations of the recumbent bicycle frame, that is to say, to design a bicycle that is practical, stable, safe, maneuverable, and above all else, easy to ride. A further, and equally important limitation to the general acceptance of recumbent bicycles has been their cost, a significant barrier to ownership. Because of their low production volumes, a recumbent bicycle tends to be significantly more expensive than a mass-produced upright bicycle.

Mayo, U.S. Pat. No. 5,951,034, discloses a kit for converting a regular upright bicycle into a semi-recumbent bicycle. An extension appliance, having a head tube and crank case, is provided for mating with the head tube of the frame of a conventional sit-up bicycle, so as to forwardly extend a front wheel relative to the rider's position on and over the sit-up frame. In-as-much as Mayo provides an alternative, albeit cost effective, to specially produced or limited production recumbent cycles, the resulting frame geometry is less than desirable and awkward: more particularly, as the extension appliance is not a structural member, a recumbent frame so formed is greatly limited with respect to fundamental performance and handling.

A further problem with most bicycles is the degree of isolation from road shock the rider is afforded. This is particularly so with recumbent bicycles.

At a minimum, up-right bicycles (i.e., those having sit-up frames) allow the rider to stand on the pedals and raise off the saddle, thereby permitting his or her legs to effectively isolate the central mass of the rider from the impact and motion associated with travel over and through rough terrain, whether in an urban or rural setting. Standing on the pedals is not possible with semi or fully recumbent bicycles.

With the popularity of mountain and other "hybrid" all terrain bicycles, a great deal of progress has been made in the area of shock absorbing suspensions for the conventional, and not-so-conventional sit-up frame. However, such adaptations are only now appearing in the marketplace.

Therefore, a need exists in the art for an affordable recumbent bicycle having a frame which possesses the rigidity, strength and light weight associated with a diamond frame. Further, there exists a need in the art for such a recumbent bicycle wherein a suspension assembly for "smoothing out" the bumps is provided.

SUMMARY OF THE INVENTION

A recumbent bicycle, the manufacture thereof, and apparatus for forming same, is provided. The recumbent bicycle generally includes a frame having joined forward and rearward frame portions. The forward frame portion is a sit-up bicycle frame adpated to support a steerable front ground engaging wheel. The rearward frame portion is adapted to support a suspension assembly, and substantially bear a rider thereon.

Preferably, the sit-up bicycle frame includes a head tube, down tube, bottom bracket, seat tube, chainstay, seatstay, and dropouts. The rearward frame portion includes a supplemental chainstay and is generally joined to the forward frame portion such that the supplemental chainstay rearwardly extends from the dropouts as a substantial continuation or extension of the chainstay of the forward frame portion.

The apparatus of the subject invention permits transformation of a sit-up bicycle into a recumbent bicycle with a minimum number of additional parts required. The apparatus generally includes a frame extension appliance for affixation to the frame of the sit-up bicycle so as to rearwardly extend therefrom. The extension appliance is adapted to support a suspension assembly, and substantially bear a rider thereon. More specific features and advantages obtained in view of those features will become apparent with reference to the drawing figures and DETAILED DESCRIPTION OF THE INVENTION.

DETAILED DESCRIPTION OF THE INVENTION

Figure 1:
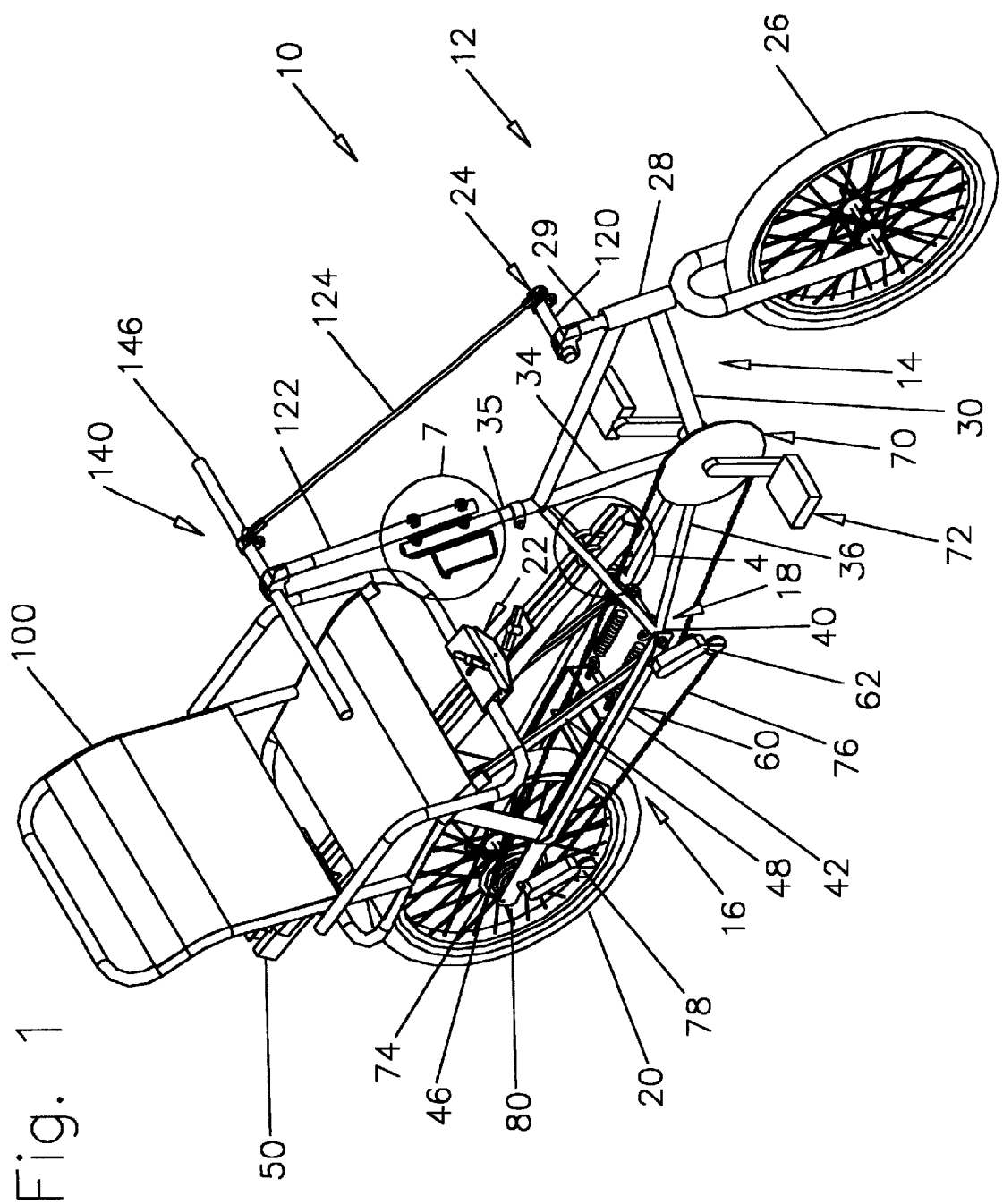
FIG. 1 is a right side perspective view of the subject invention shown from slightly forward and slightly above.
Figure 2:
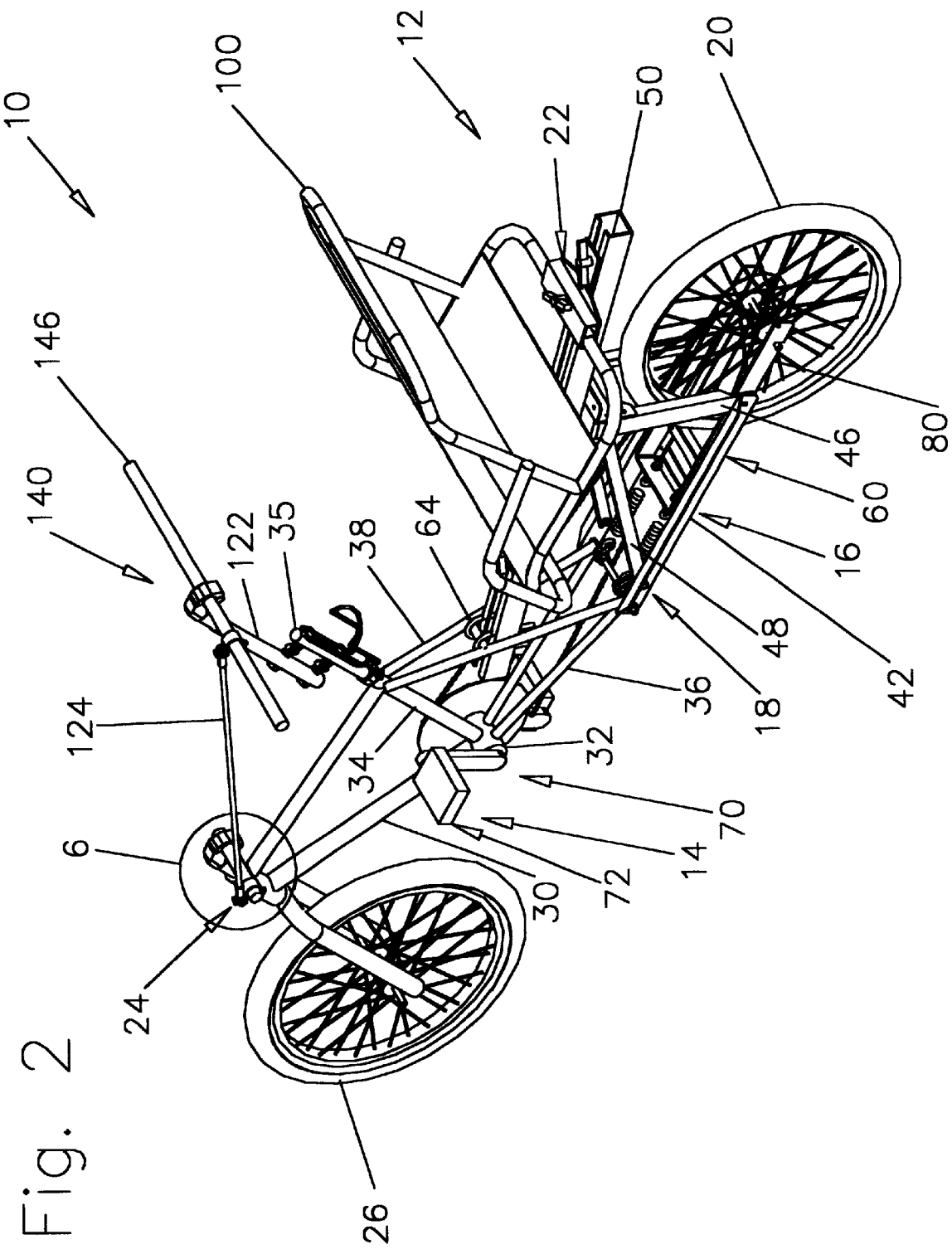
FIG. 2 is a left side perspective view thereof shown slightly from the rear and above particularly showing the handlebar assembly and front wheel proportionally rotated.

As generally shown in FIGS. 1 & 2, the recumbent bicycle 10 of the subject invention includes a frame 12 having joined forward 14 and rearward 16 portions, a suspension assembly 18 for pivotably supporting a rear ground engaging wheel 20, a seat mounting assembly 22, and a steering mechanism 24. Each of these components or subassemblies, including their relationships with each other, and to other elements of the recumbent bicycle, will be detailed hereinbelow.

Hereinafter, the "forward" direction relates to the direction which the vehicle travels when in operation (i.e., generally in the direction proceeding from the rear wheel to the front wheel), with the "rear" direction opposite thereto. The "left" side of the vehicle is with respect to the left side of a rider when seated in operating position, with the "right" side being with respect to the right side of such rider.

THE FRAME

As best seen in FIGS. 1 & 2, the frame 12 of the recumbent bicycle 10 has joined forward 14 and rearward 16 frame portions. The forward frame portion 14 (i.e., the body) is adpated to support a steerable front ground engaging wheel 26, with the rearward frame portion 16 (i.e., the frame extension appliance) adapted to support the suspension assembly 18, and bear a rider thereover and to a great extent, thereon.

The front frame portion 14 generally comprises a sit-up bicycle frame having a head tube 28, down tube 30, bottom bracket 32, seat tube 34, chainstay 36, seatstay 38, and dropouts 40, with all known tube construction materials (e.g., steel, chrome/molybdenum, aluminum, carbon fiber, etc.) being suitable, and not necessarily critical, for present purposes. Although the front frame portion is generally configured consistent with the traditional "diamond" frame, alternate sit-up frame configurations (e.g., the "ladies" frame or the mixte frame) are suitable and readily adaptable for present purposes.

The body 14 of the recumbent bicycle frame 12 is preferably a BMX (i.e., bicycle moto-cross) style frame, as its aggressive geometry offers excellent strength and stability, generally providing a squat frame with head angles ranging between about 68 to 78 degrees, seat angles in the range of about 68 to 74 (or more) degrees, chainstays of up to about 18 inches, and a bottom bracket height usually from about 10.75 to 13 inches. Such arrangement of frame components greatly contribute to a sound mechanical posture for a rider of the recumbent bicycle of the present invention.

As will be better appreciated as this description proceeds, the selection and incorporation of a sit-up bicycle frame, as well as other select components, in the recumbent bicycle of the present invention, whether BMX, mountain bike, mixte, etc., provides at least a two fold advantage: first, a fundamentally strong, stable, responsive, and proven rider support structure; and two, a cost-effective, highly attractive alternative to a custom frame. As a matter of fact, the forward frame portion of the subject recumbent bike is readily available at no, or little cost: such component need not be new, instead it is likely that an old bike is lying around the garage, basement, etc., or easily acquired for no or little cost, the frame of which being quickly and efficiently convertible into the recumbent bicycle of the present invention.

Referring now to FIGS. 1–4, the rearward frame portion 16 of the recumbent frame 12 includes: a supplemental chainstay 42 joined at one end by a dropout rod 44, primary 46 and secondary 48 seatstays upwardly extending from the supplemental chainstay 42, and a top tube 50, supported indirectly by the seatstays 46, 48, adapted to adjustably receive the seat mounting assembly 22. The primary 46 and secondary 48 seatstays, in combination with the supplemental chainstay 42, form the rearward most structural member (i.e., triangle) for the recumbent frame 12. The primary seatstay 46 extends upwardly, and generally forward, from the back end of the supplemental chainstay 42, with the secondary seatstay 48 extending upward, and generally rearward, from a point near the front end of the supplemental chainstay 42. The primary 46 and secondary 48 seatstays are in turn joined together, terminating at a rear top tube mount 52 to which the top tube 50 of the rearward frame portion 16 is attached.

Figure 3:
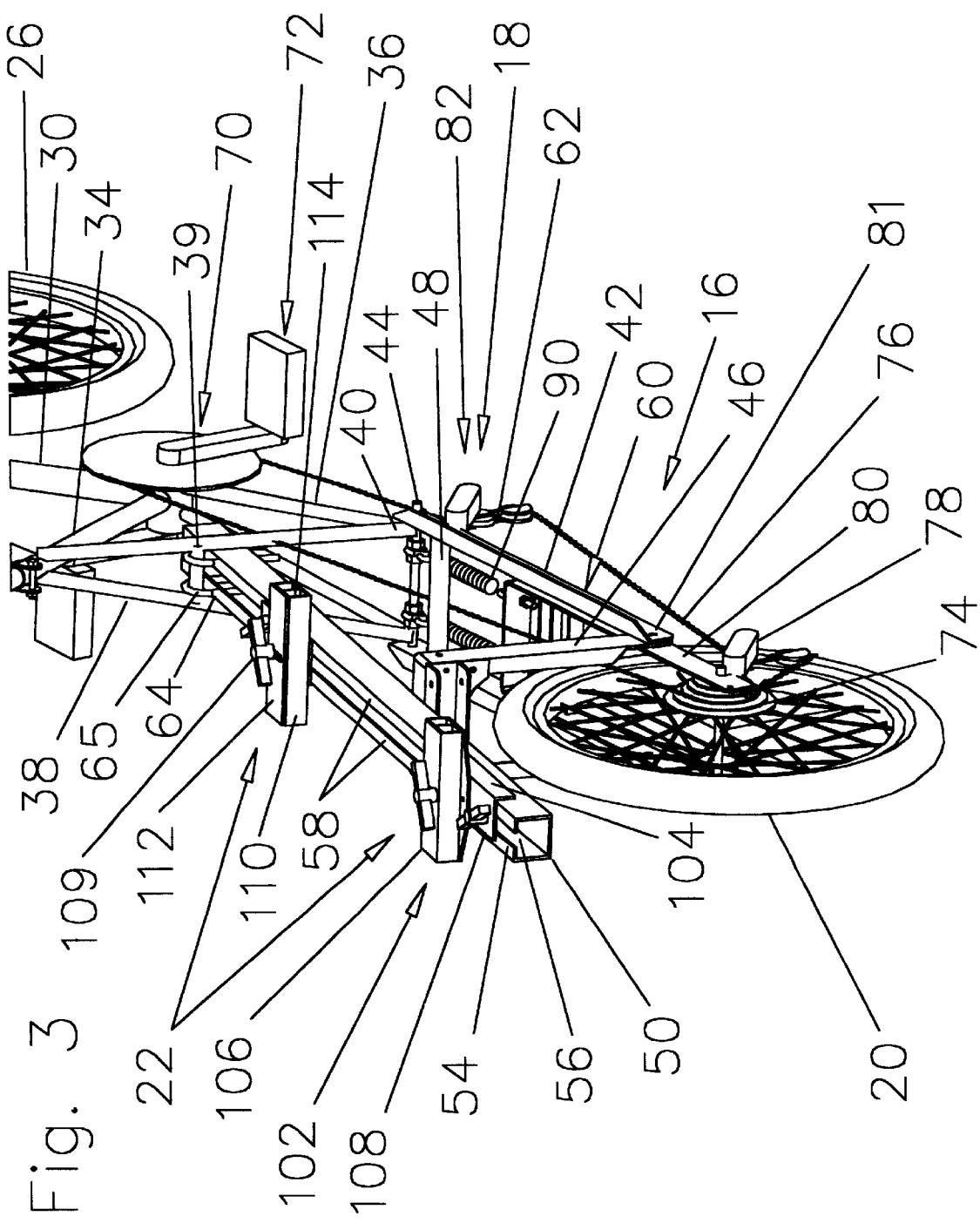
FIG. 3 is a fragmentary perspective view thereof with parts removed, showing the subject invention from the right side, to the rear and above, looking forward, particularly illustrating the frame extension appliance.
Figure 4:
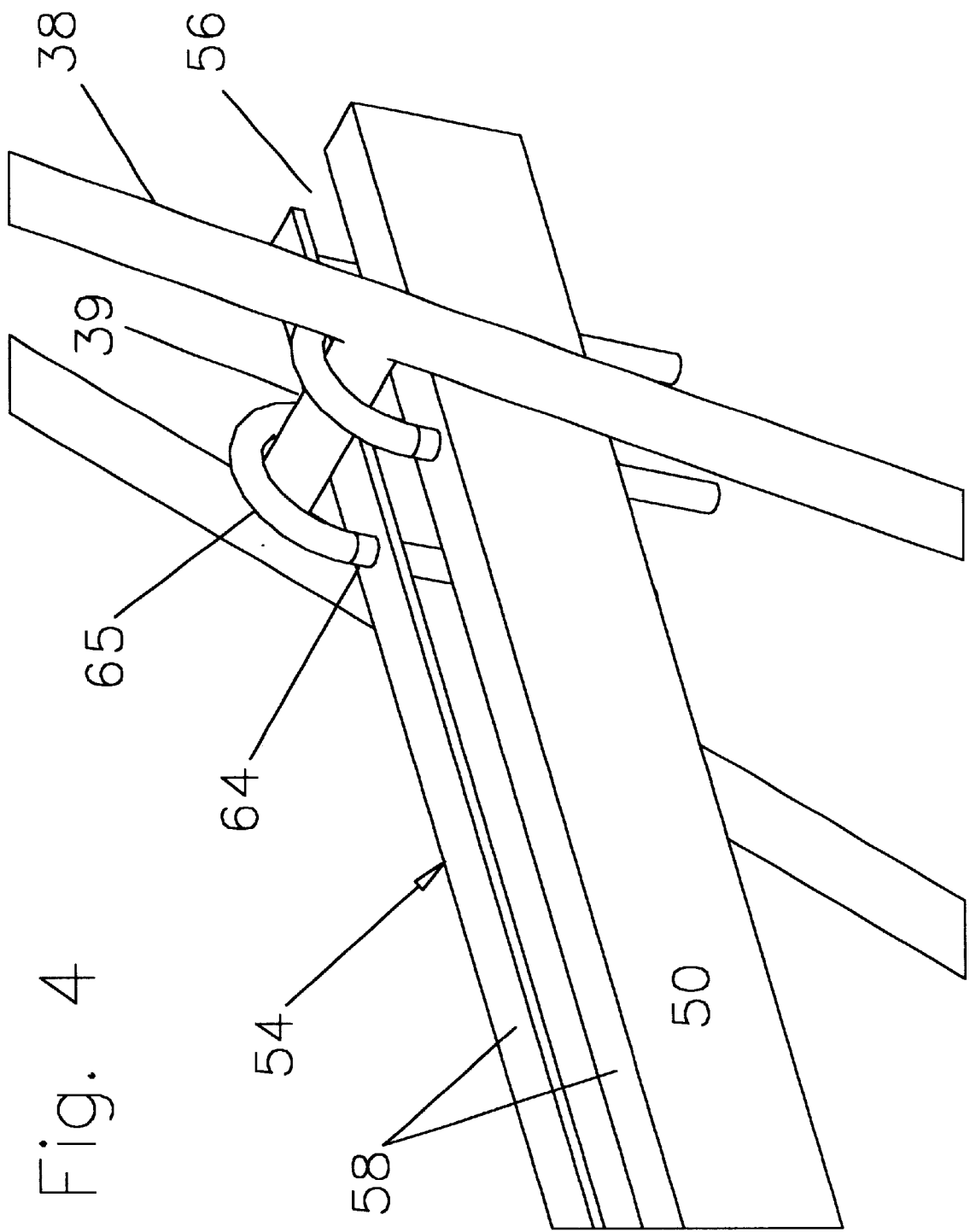
FIG. 4 is a fragmentary detail taken from area encircled at 4 in FIG. 1, particularly illustrating the upper linkage between frame portions.

The top tube 50, as best seen in FIG. 3, is generally configured as a channeled member, for instance a box beam or the like. The upper surface 54 of the top tube 50 is grooved substantially throughout its length, so as to receive components of the seat mounting assembly 22, and permit travel there along. More particularly, the groove or slot 56 in the top surface 54 of the top tube 50 defines a pair of channel flanges 58 which cooperatively engage a portion of the seat mounting assembly 22, as will be detailed later. Preferably, but not necessarily, the top tube 50 has at least one "open" end so as to at least initially receive at least a portion of the seat mounting assembly 22. The top tube is suitable adapted to carry items such as a reflector, mud flaps, etc.

As to the general relationship between the frame portions, the rearward frame portion 16 is generally joined to the forward frame portion 14 such that the supplemental chainstay 42 rearwardly extends from the dropouts 40 of the forward frame portion 14 so as to be a substantial continuation or extension of the chainstay 36 of the forward frame portion 14. The dropout rod 44, which forms a closed end for the supplemental chainstay 42, is reversibly received in the dropouts 40 of the sit-up frame 14, and secured therebetween in a known manner (FIG. 3). By this construction and arrangement, an elongated chainstay 60 is thereby formed for the frame of the recumbent bicycle (FIGS. 1 & 2). A supplemental chain tensioner 62 is suspended from the "chain side" of the elongated chainstay 60, so as to minimize unwanted slack in the chain of the drive assembly.

The top tube 50, which is substantially supported by the rearward most frame triangle, is further supported by the forward frame portion 14 of the recumbent frame 12, namely at a linkage thereto. The top tube 50 is preferably joined to the forward frame portion 14 at the seatstay spreader 39 thereof, as by the use of "U"-bolts 64 or the like. Alternately, the top tube may be forwardly supported from other structures of the body of the recumbent frame. As the bend of the U-bolt 64 snugly embraces the seatstay spreader 39 of the forward frame portion 14, a segment of polyethylene tubing 65 is provided about the bend to generally prevent direct contact therebetween, thus protecting the surface finish of the spreader 39.

DRIVE ASSEMBLY

The drive assembly 70 for the recumbent bicycle 10 operates to enable a rider to propel the bicycle. It is preferable that such a drive assembly have a free wheel so that the driven wheel is able to rotate without a corresponding rotation in the pedals. It is also preferable to include multiple gears to permit different gearing for different users and riding conditions. The preferred drive assembly includes a pedal assembly 72, a free wheel assembly 74, a chain 76, and a gear shift mechanism 78. With respect to the drive train, it should be understood that modifications in lengths of items such as the chain, cables (e.g., brake and shifting), etc., necessitated by the effective rearward elongation of a conventional sit-up frame of the recumbent bicycle of the present invention, are well within the skill of a person of ordinary skill in the bicycle art, and need not be detailed.

THE SUSPENSION ASSEMBLY

Figure 5:
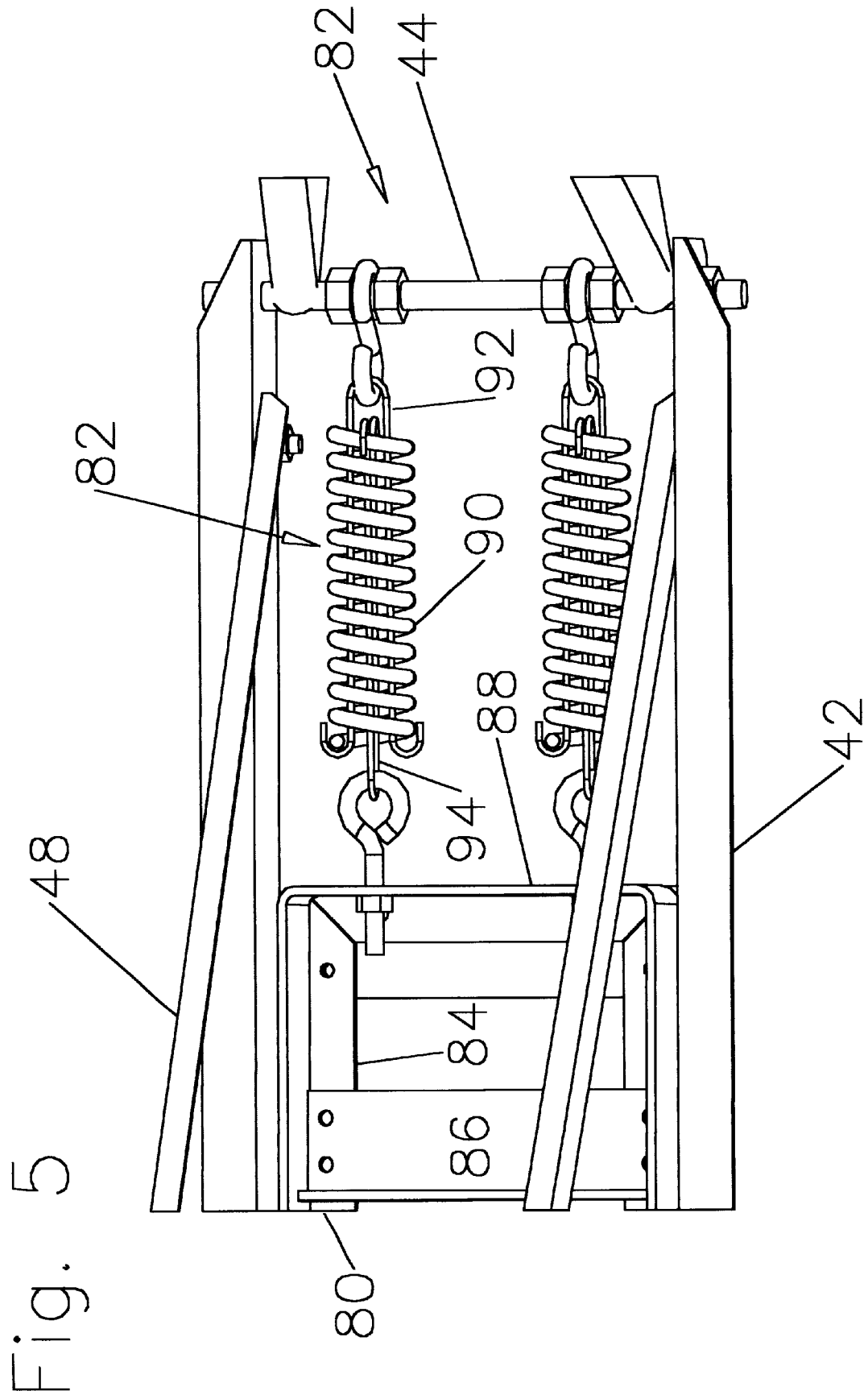
FIG. 5 is a fragmentary right side detail perspective view thereof showing the details of the lower linkage between frame portions, as viewed from above.

Referring now to FIGS. 3 & 5, the suspension assembly 18 is shown pivotably attached to the rearward frame portion 16 such that the rear ground engaging wheel 20 is vertically responsive to variable ground surface conditions. The suspension assembly 18 includes a swing arm 80 adapted to receive and retain rear ground engaging wheel 20, and a spring assembly 82 for biasing the swing arm 80 about the pivot attachment 81. The spring assembly 82 generally links an end of the swing arm 80, at least indirectly, to the frame body 14.

The swing arm 80 is positioned, relative to the other rearward frame portion elements, to be received between the parallel arms (i.e., tubes) of the supplemental chainstay 42 for attachment thereto. The swing arm 80 generally includes a pair of parallel braces 84 which are spaced apart by a spreader 86. The braces 84 are joined at one end so as to thereby form a "head" 88 for the swing arm 80 (i.e., a closed front end), with the rear wheel 20 being received and retained, in a known manner, at an end opposite the head 88 of the swing arm 80. The swing arm 80 is rotatingly connected, at its braces 84, to the supplemental chainstay 42, more particularly, the braces 84 of the swing arm 80 are connected to the rearward frame portion 16 at the union or interface of the supplemental chainstay 42 and the primary seatstay 46, to thereby define the pivot point 81 for the suspension assembly 18 relative to the frame 12 of the recumbent bicycle 10.

The spring assembly 82 generally includes a spring 90 or other tensioning element, more preferably a pair of springs, and hardware for suspending same between the swing arm 80 and the drop out rod 44 of the rearward frame portion 16. As best seen in FIG. 5, each spring of the pair preferably has front 92 and rear 94 through buckles. The front through buckle 92 is attached to the dropout rod 44 via an "S" hook, which is fixedly positioned along the length of the dropout rod 44, whereas the rear through buckle 94 is secured to the head 88 of the swing arm 80 by an eye bolt or the like.

It is advantageous that the spring assembly 82 be selectively adjustable to effect frame stiffness, and thereby provide a sought after performance. Towards this end, the springs 90 of the spring assembly 82 are, via the rear through buckle 94, adjustable. Again with reference to FIG. 5, the eye bolt which secures the rear through buckle 94, is reversibly extendable relative to the head 88 of the swing arm 80 so as to thereby adjust (i.e., modify) the tension of the spring 90 between relative a maximum and a minimum, such end points being defined largely by the length of the threaded shank of the eye bolt. For instance, FIG. 5 shows the eye portion of the eye bolt minimally extended from the head of the swing arm, resulting in "maximum" tension for the springs, which in turn provides a "stiff" frame condition. Furthermore, dampening means such as a shock absorber or the like, may be appropriately added to obtain a sought after riding characteristic without departing from the subject matter of the subject invention.

THE SEAT MOUNTING ASSEMBLY

Referring again to FIGS. 1–3, a seat mounting assembly 22 is shown for releasably affixing or retaining a chair 100 (i.e., high back seat or the like) to the top tube 50 of the rearward frame portion 16, and for selectively adjusting same therealong, so as to quickly accommodate riders of variable height on the recumbent bicycle 10. The seat mounting assembly 22 preferably, but not necessarily, includes a pair of identical brackets 102 having channel 104 and chair 106 clamp portions, namely a front and rear bracket for supporting a chair, preferably a beach (i.e., "surf", or "sand") chair, or other low slung style chair having a frame, and suspended therefrom, back and seat portions. Aside from the obvious benefits associated with riding comfort that such chair affords, this style chair has a particular functionality apart from the bicycle: upon arrival at the beach, park, etc., it is quickly and easily removed for use apart from the bicycle at the destination.

The channel clamp portion 104 of the seat mounting assembly 22 generally includes opposed sliding members 108 (i.e., an upper and lower sliding member) which are arranged (i.e., held in a spaced apart condition) to receive, and adapted to compressioningly grip, the channel flanges 58 of the top tube 50 therebetween. Preferably, a bolt extends upwardly from the underside (i.e., bottom surface) of the lower sliding member and through the upper sliding member. Receivable on the threaded shank of the bolt is an easily rotatable wing nut 109 for urging the upper sliding member 108 into engagement with the channel flanges 58, for clamping the channel clamp 104 to the top tube 50. A spacer, for example a nut, is disposed on the bolt, positioned above the top surface of the lower sliding member, to space apart the sliding members. As best seen in FIG. 3, the upward extending bolt "rides" within the channel 56 when the seat mounting assembly 22 is slidable adjusted on the top tube 50. Other supplemental hardware, such as washers and the like, is used in a traditional way to complete the channel clamp portion 104 of the seat mounting assembly 22.

The chair clamp portion 106 of the seat mounting assembly 22 generally includes a base member 110, adapted to receive a portion of a chair frame, and a chair frame holder 112 supported by the base member 110, and adjustably mounted with respect thereto for clasping down against the portion of the chair frame received in the base member 110. The base member 110 includes a slot 114 for receiving a portion of the chair frame. Such structure is preferably formed by angle irons, for instance, as is shown in FIG. 3, wherein the base member 110, which is a plate having an upwardly extending flange, includes an angle iron having an upwardly extending flange in a spaced apart parallel condition to the flange of the base plate so as to form the slot. Preferably, a bolt extends upwardly from the underside (i.e, bottom surface) of the base member and through the chair frame holder. Receivable on the threaded shank of the bolt is an easily rotatable wing nut 109 for urging the chair frame holder 112 into clasping engagement with a portion of a chair frame received in the slot 114 of the base member 110, for clasping the chair to the seat mounting assembly 22. Other supplemental hardware, such as washers and the like, is used in a traditional way to complete the chair clamp portion of the seat mounting assembly.

To adjust the seat 100 of the recumbent bicycle 10 for proper pedal engagement, the wing nuts 109 of each channel clamp portion 106 of the front and rear brackets 102 are loosened such that the seat 100 may be slid, forwardly or rearwardly with respect to the pedals 72, within the channel 56 of the top tube 50. Upon achieving a comfortable "fit", the wing nuts 109 are tightened to secure the mounting assembly 22, and the chair 100 thereby, in place. When transporting the recumbent bicycle, or otherwise desiring to remove the seat for other purposes, the wing nuts of the chair clamp portion only need be loosened so as to free those portions of the seat frame captured thereby. As the position of the channel clamp portion remains unchanged, no additional adjustments are necessary when desiring to resume riding activities once the seat has been reattached.

STEERING MECHANISM

Referring now generally to FIGS. 1 & 2, there is shown a steering mechanism 24 configured to indirectly manipulate the steerer tube 29 of the front frame portion 14 (i.e., the body) of the recumbent bicycle frame 12. The steering mechanism 24 generally includes a steering bend 120, a supplemental stem 122, and a push rod 124 for connecting the steering bend 120 to the supplemental stem 122, such that a partial turning of the supplemental stem 122 effectuates a corresponding partial turning of the steerer tube 29 of the forward frame portion 14.

Figure 6:
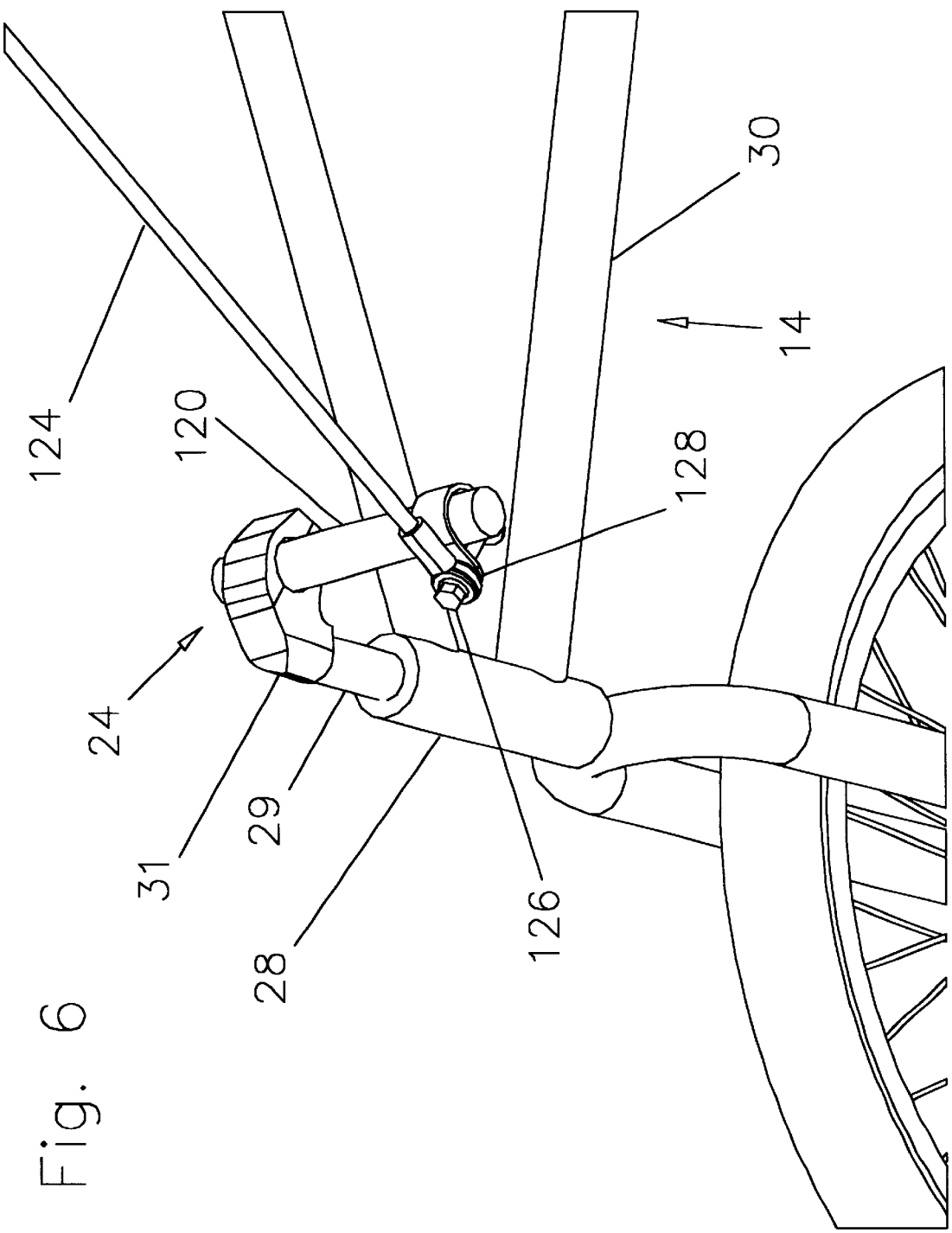
FIG. 6 is a fragmentary left side perspective taken from above into the mid-line thereof, detailing the area encircled at 6 in FIG. 2, particularly illustrating the steering bend of the modified steering mechanism.

As best seen in FIG. 6, the steering bend 120 is supported by the stem 31 of the sit-up frame 14 (i.e., the bend 120 is preferably substituted for the handlebar assembly 140), in a known fashion. The "sweep" of the bend 120, and angular deployment of the bend 120 in the "old" stem 31 relative to the horizon can be variable, depending in large part on the specific geometric configuration of the forward frame portion 14 (e.g., angle of the seat tube and/or head tube, etc.), as well as contingent upon the height/arm length of the rider (i.e., height of the handlebar assembly 140 relative to the head tube). A bearing stud 126 is carried by the steering bend 120 to receive a spherical bearing 128 positioned at an end of the push rod 124, with a bearing stud end nut 130 securing the push rod 124, at one end, to the steering bend 120.

Figure 7:
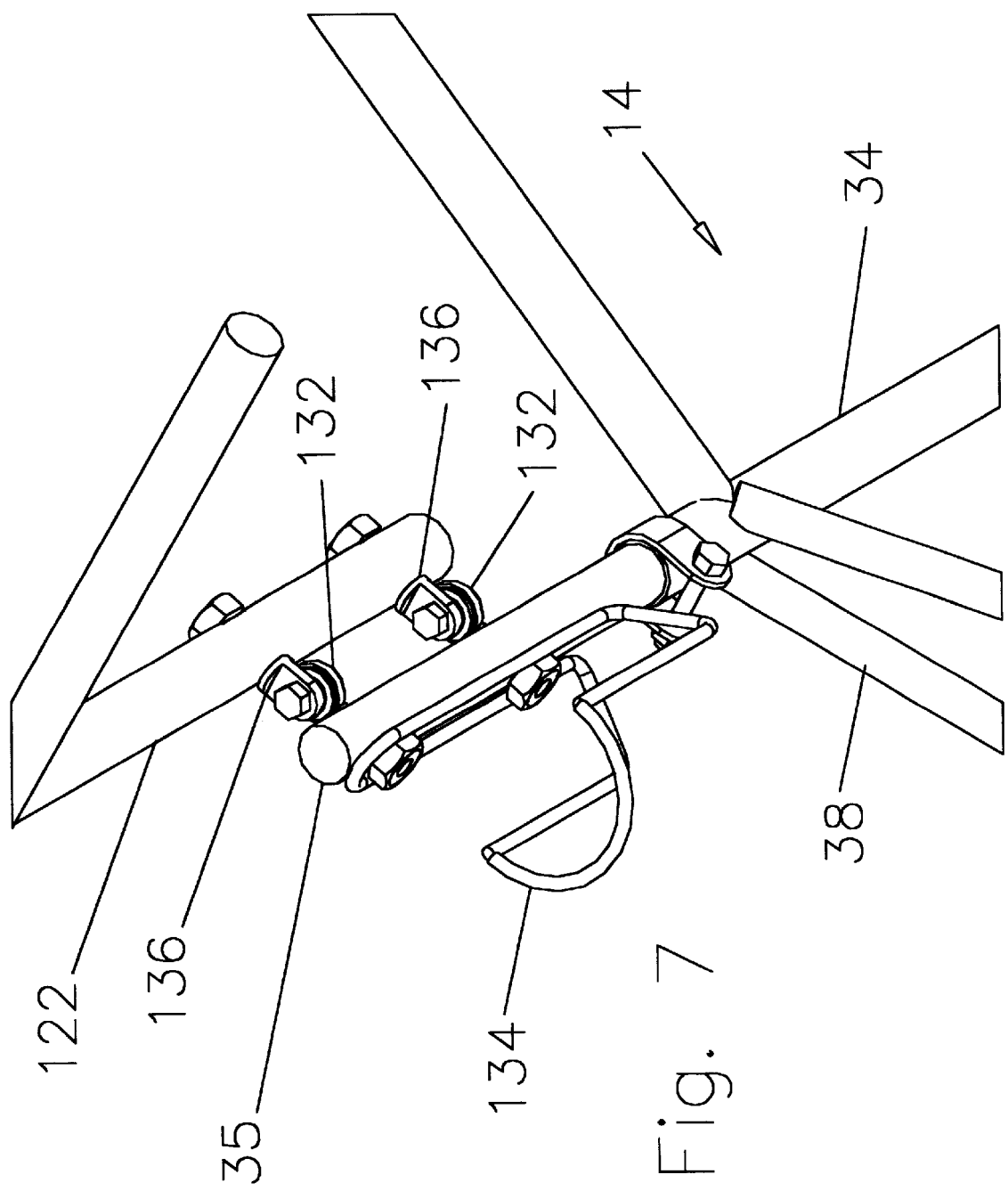
FIG. 7 is a fragmentary right side perspective view taken from slightly above, detailing the area encircled at 7 in FIG. 1, particularly illustrating integration of the supplemental stem to the seat post; and, FIG. 8 is a fragmentary right side perspective taken from above and across the mid-line of the invention to show detail of the left side, namely the anchoring of the push rod to the handlebar.

Referring now to FIG. 7, the supplemental stem 122 is rotatably affixed to a seat post 35 which is received in the seat tube 34 of the front frame portion 14, and secured therein with a conventional seat post clamp. As shown, the seat post 35 is adapted to carry upper and lower stem bearings 132 and a cage 134 for holding a water bottle, such location being ideal for easy rider access (note FIGS. 1 & 2). The supplemental or "new" stem 122 is equipped with a pair of apertured ears or flanges 136, positioned for mating with the bearings 132 of the seat post 35. The ears 136 are alignable so as to register with the seat bearings 132, and are joined to the seat bearings 132 by an axle bolt and nut 138 so as to connect the supplemental stem 122 to the seat post 35 for rotation with respect thereto.

Figure 8:
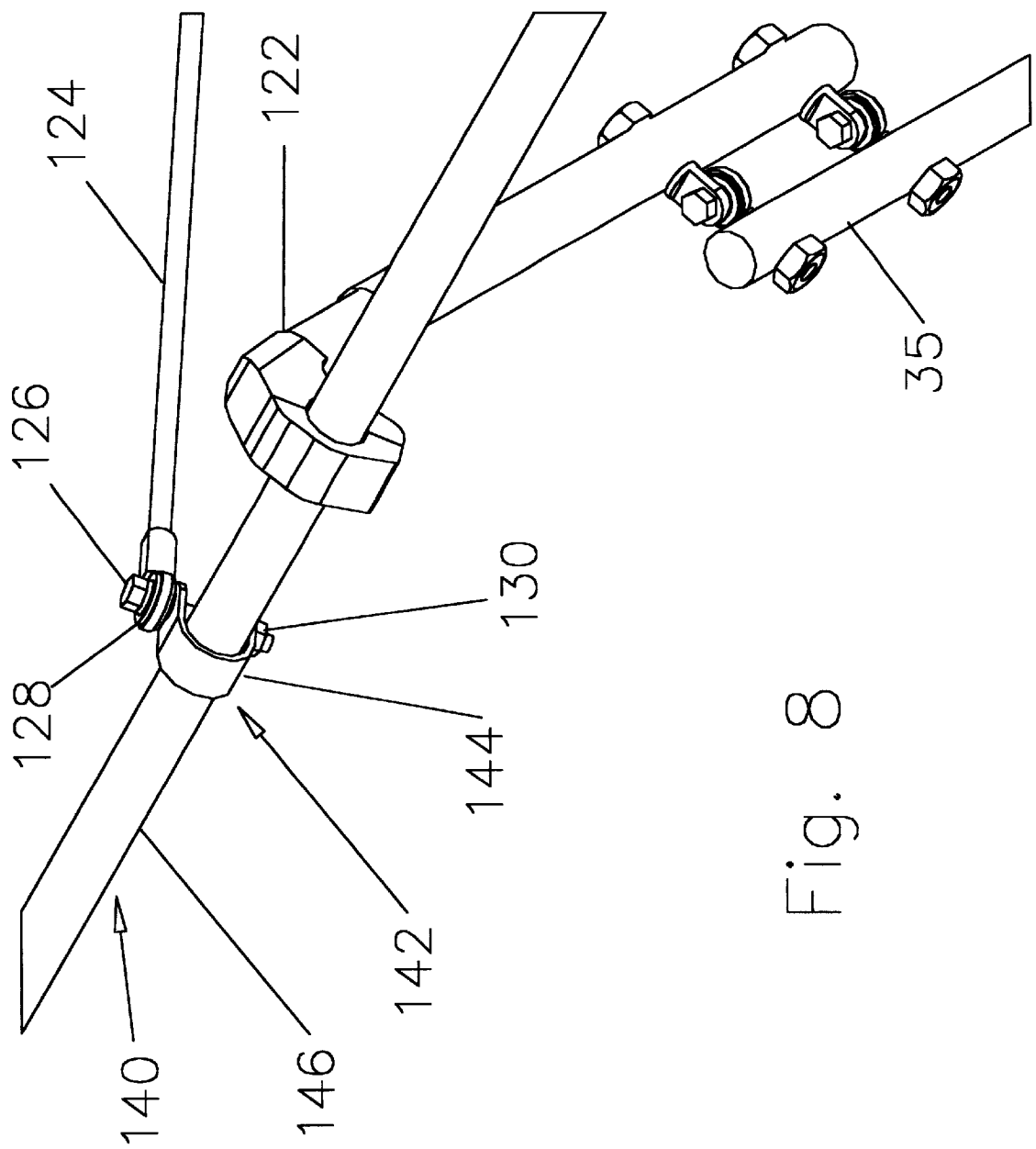

Referring now to FIG. 8, an otherwise conventional handlebar assembly 140 (e.g., the assembly for which the steering bend 120 is substituted in the "old" stem 31) is show as having a push rod mounting assembly or receiver 142. The push rod mounting assembly 142 generally includes a handlebar clamp 144 adapted to fasten to the handlebar 146 of the handlebar assembly 140, and a bearing stud 126 for supporting the forward end of the push rod 124. A bearing stud 126 receives a spherical bearing 128 positioned at the forward end of the push rod 124, with a bearing stud end nut 130 securing the forward end of the push rod 124 to the handlebar 146 of the handlebar assembly 140. As is readily apparent from the above description and accompanying figures, manipulation of the handle bar 146 supported by the "new" stem 122 correspondingly manipulates the steerer tube 29 of the forward frame portion 14 to effectuate precise turning for the recumbent bicycle 10 of the subject invention.

While a preferred embodiment of the present invention has been described, it should be understood that various changes, adaptations and modifications may be made therein without departing from the spirit of the invention. Changes may be made in details, particularly in matters of shape, size, material, and arrangement of parts without exceeding the scope of the invention. Accordingly, the scope of the invention is as defined in the language of the appended claims.

What is claimed is:

1. A conversion kit for transforming a sit-up bicycle into a recumbent bicycle, the sit-up bicycle having a frame comprising a head tube, down tube, bottom bracket, seat tube, chainstay, seatstay, seatstay spreader and dropouts, the sit-up bicycle further having a stem, a steerer tube and a seat post supported by the frame, said conversion kit comprising, a frame extension appliance for affixation to the frame of the sit-up bicycle so as to rearwardly extend therefrom, said appliance being adapted to support a suspension assembly and substantially bear a rider thereon, said frame extension appliance comprising a supplemental chainstay, said frame extension appliance being joined to said sit-up bicycle frame such that said supplemental chainstay rearwardly extends from said dropouts as a substantial continuation of said chainstay of said sit-up bicycle frame.

2. The conversion kit of claim 1 wherein said supplemental chainstay includes a dropout rod, said dropout rod being fixedly receivable in said dropouts of said sit-up bicycle frame.

3. The conversion kit of claim 2 where in s aid frame extension appliance further includes a primary seatstay and a top tube, said top tube being substantially supported by said primary seatstay and supportable by said seatstay spreader of said sit-up frame, said primary seatstay being joined to said supplemental chainstay so as to upwardly extend therefrom.

4. The conversion kit of claim 3 wherein said top tube comprises a channeled beam.

5. The conversion kit of claim 4 further comprising a suspension assembly for suspendingly supporting a rear ground engaging wheel, said suspension assembly being pivotabiy attached to said frame extension appliance such that the rear ground engaging wheel is responsive to variable ground surface conditions.

6. The conversion kit of claim 5 wherein said suspension assembly comprises a swing arm and tensioning means, said swing arm adapted to fixedly receive the rear ground engaging wheel, said tensioning means resiliently linking an end of said swing arm to said dropout rod of said frame extension appliance so as to permit a tensioned pivot travel of said swing arm about said pivot attachment in response to ground surface conditions encountered by the rear ground engaging wheel and transmitted thereby to said swing arm.

7. The conversion kit of claim 6 wherein said tensioning means is selectively adjustable.

8. The conversion kit of claim 7 further comprising a seat mounting assembly, said seat mounting assembly adapted to releasably retain a portion of a seat, said seat mounting assembly being selectively adjustable along said channeled beam so as to quickly accommodate riders of variable height.

9. The conversion kit of claim 8 further comprising a steering mechanism configurable to indirectly manipulate said steerer tube of said sit-up bicycle.

10. The conversion kit of claim 9 wherein said steering mechanism comprises a steering bend, a supplemental stem and a push rod, said steering bend being supportable by said stem of said sit-up bicycle, said supplemental stem being rotatably affixable to said seat post of said sit-up bicycle, said push rod capable of linking said steering bend to said supplemental stem such that a partial turning of said supplemental stem effectuates a corresponding partial turning of said steerer tube of said sit-up bicycle.

* * * * *